United States Patent
Barden

[11] Patent Number: 6,148,254
[45] Date of Patent: Nov. 14, 2000

[54] METHOD AND APPARATUS FOR CONTROLLING A BUCKET AND THUMB OF A WORK MACHINE

[75] Inventor: William M. Barden, Raleigh, N.C.

[73] Assignee: Caterpillar Inc., Peoria, Ill.

[21] Appl. No.: 09/271,950

[22] Filed: Mar. 18, 1999

Related U.S. Application Data

[60] Provisional application No. 60/079,436, Mar. 26, 1998.

[51] Int. Cl.[7] .............................. G06F 7/70; G06F 19/00
[52] U.S. Cl. ................................. 701/50; 172/4.5; 172/9; 37/348
[58] Field of Search ..................... 701/1, 49, 50; 172/2, 3, 4.5, 9; 414/680, 699; 37/347, 348

[56] References Cited

U.S. PATENT DOCUMENTS

| | | | |
|---|---|---|---|
| 5,065,326 | 11/1991 | sahm ........................................ | 701/50 |
| 5,461,803 | 10/1995 | Rocke ....................................... | 37/443 |
| 5,493,798 | 2/1996 | Rocke et al. .............................. | 37/348 |
| 5,528,498 | 6/1996 | Scholl ....................................... | 701/50 |
| 5,611,656 | 3/1997 | Davis et al. ............................. | 414/694 |
| 6,032,093 | 2/2000 | denbraber et al. ........................ | 701/50 |

*Primary Examiner*—William A. Cuchlinski, Jr.
*Assistant Examiner*—Gertrude Arthur
*Attorney, Agent, or Firm*—Byron G. Buck

[57] ABSTRACT

An apparatus and method for controlling the clamping forces on an object being held between a bucket and a thumb of a work machine is disclosed. The apparatus and method controls the head and rod end pressures of the bucket and thumb hydraulic cylinders to substantially maintain a desired clamping pressure on the gripped object, thereby providing at a touch of a switch, a work machine that can be controlled as the thumb and forefinger combination of the human hand which gives a "wristlike" action to the bucket thumb combination.

16 Claims, 3 Drawing Sheets

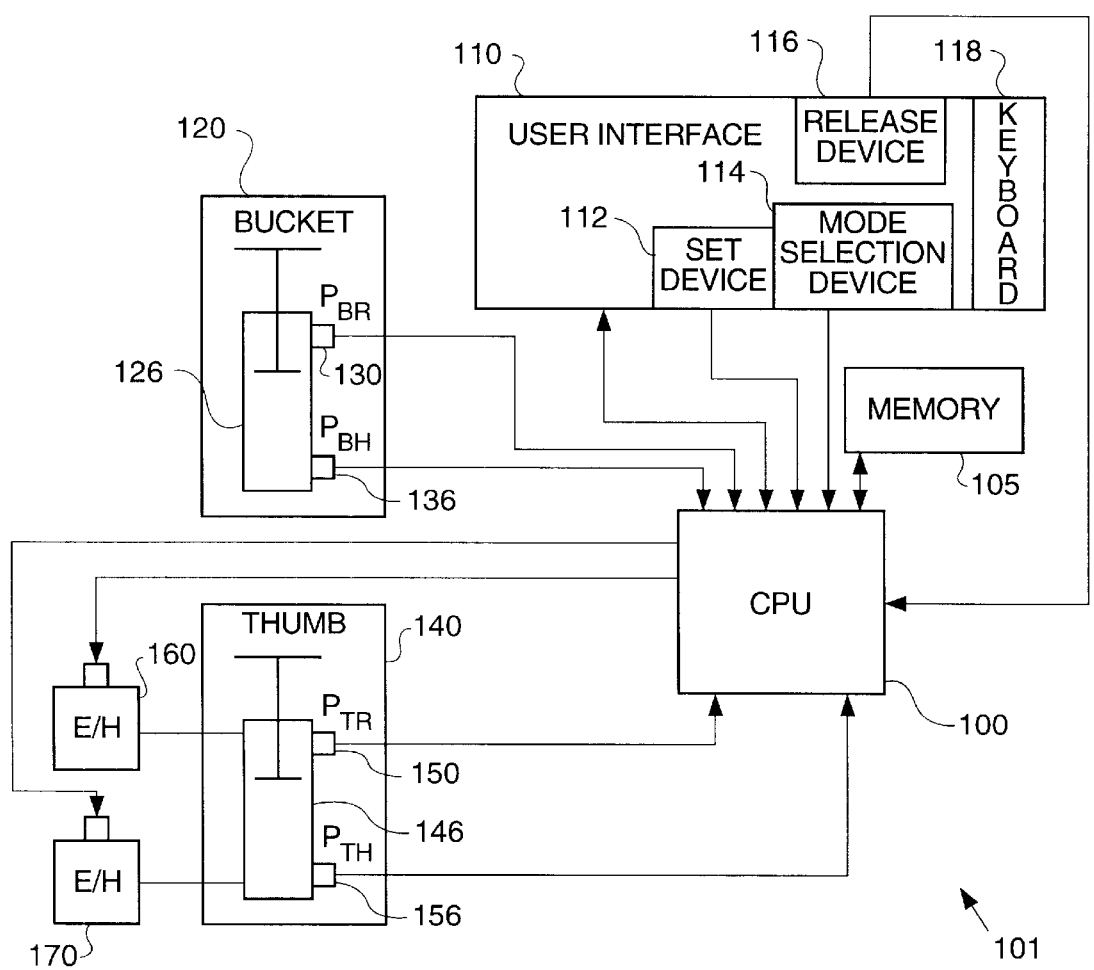
Fig_1_

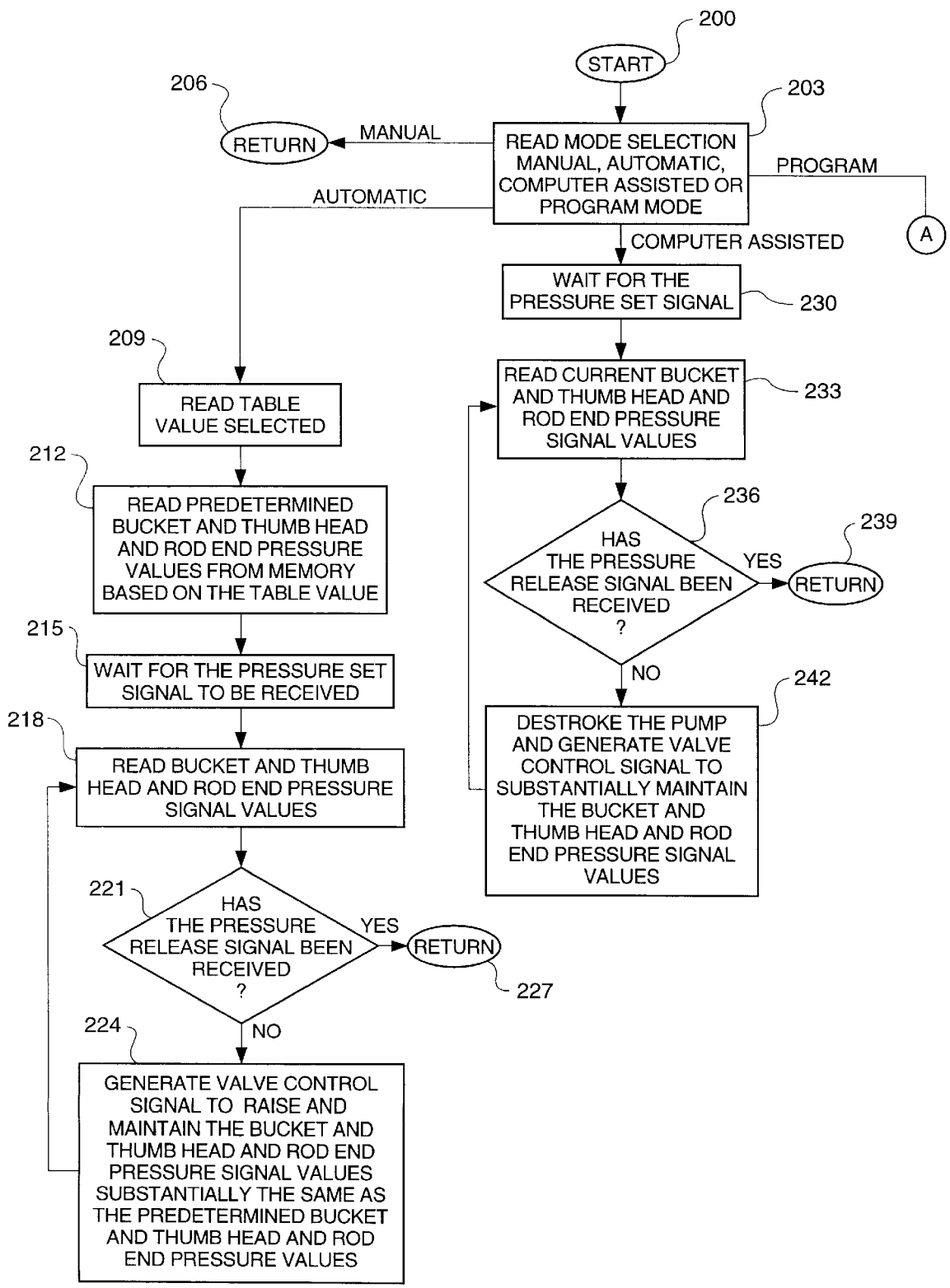
Fig_2a_

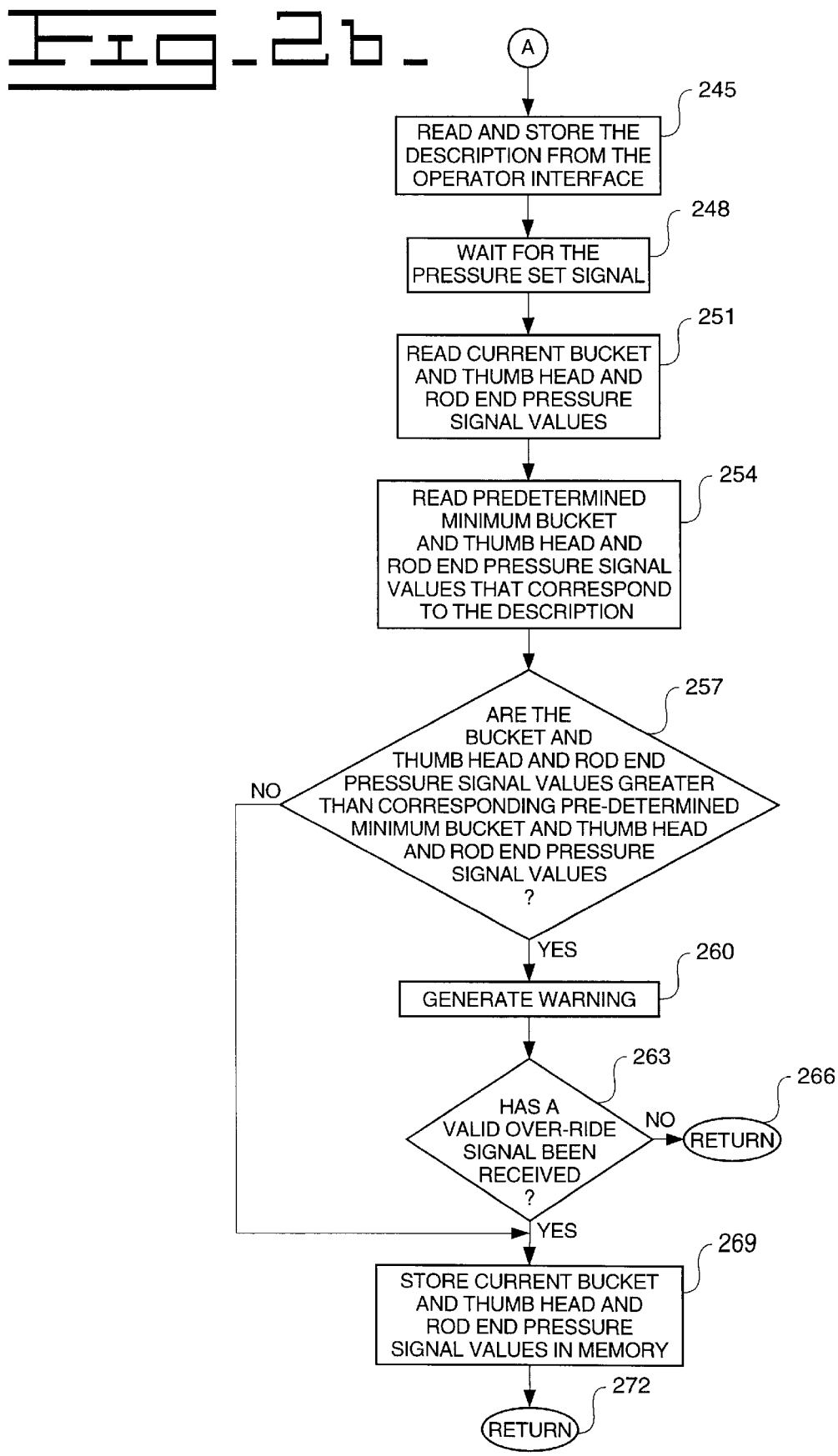
Fig_2b_

6,148,254

METHOD AND APPARATUS FOR CONTROLLING A BUCKET AND THUMB OF A WORK MACHINE

This application claims the benefit of prior provisional patent application Ser. No. 60/079,436 filed Mar. 26, 1998.

TECHNICAL FIELD

This invention relates generally to an apparatus for controlling a bucket and thumb of a work machine and, more particularly, to a method and apparatus for controlling the clamping force on an object held between a bucket and a thumb.

BACKGROUND ART

Work machines having an attached implement, such as excavators, backhoes and the like, are often used for moving and placing heavy but delicate objects, such as pipe, work equipment, stumps, tree stems, and the like. The typical work cycle associated with a bucket and thumb includes sequentially positioning the bucket and thumb proximate the object to be moved and then operating the bucket and the thumb in a manner that clamps the object between the bucket and the thumb.

Currently, on many work machines, it is possible to damage the object being clamped if excessive pressure or clamping force is applied by the bucket and thumb. This damage is often the result of the operator of the work machine applying excessive force on the object while moving the object to another location. Currently, the machine operator must ensure that the bucket and thumb is properly operated to prevent damage to the object being moved. In normal operation of a work machine, many events are occurring simultaneously. This increases the potential for operator error, including the risk of applying excessive force to the object being moved.

The present invention is directed to overcoming one or more of the problems as set forth above.

DISCLOSURE OF THE INVENTION

In one aspect of the present invention, an apparatus and method for controlling the clamping force on an object being held between a bucket and thumb of a work machine is disclosed. The bucket and thumb is connected to the work machine and are moveable in response to operation of hydraulic cylinders. The apparatus includes an electronic controller, at least one pressure sensor, an operator control means and a reciprocating device. The at least one pressure sensor is electrically coupled to the electronic controller and is adapted to produce a pressure signal indicative of the pressure applied by the bucket and thumb. The operator control means provides a pressure set and pressure release signal to the electronic controller. The pressure signal is indicative of a desired pressure of the bucket and thumb. The reciprocating device is adapted to move the thumb relative to the bucket. The electronic controller receives the at least one pressure signal, the pressure set and pressure release signals and delivers command signals to the reciprocating device in order to control the pressure of the thumb and the bucket acting on the object being held therebetween.

These and other aspects and advantages of the present invention will become apparent to those skilled in the art upon reading the detailed description of the Best Mode for Carrying Out the Invention in connection with the drawings and appended claims.

BRIEF DESCRIPTION OF THE DRAWINGS

For better understanding of the invention, a reference may be made to the accompanying drawings, in which:

FIG. 1 is a schematic diagram of the preferred embodiment of the present invention; and FIG. 2 is a flow chart illustrating software used in connection with the preferred embodiment of the present invention.

BEST MODE FOR CARRYING OUT THE INVENTION

A preferred embodiment of the present invention provides as apparatus 101 and a method for controlling clamping force on an object being held between a bucket 120 and a thumb 140 on a work machine (not shown). In FIG. 1, an implement control system 101 is generally shown. FIG. 1 shows an electronic controller 100 associated with a memory 105 being electrically connected to a user interface 110, a bucket rod end pressure sensor 130, a bucket head end pressure sensor 136, a thumb rod end pressure sensor 150, a thumb head end pressure sensor 156, and a pair of electrohydraulic valves 160, 170.

The memory 105 is adapted to store data corresponding to specific pressure to be applied by the bucket and thumb for a particular object being moved. Further, the memory 105 is capable of storing predetermined minimum bucket and thumb head and rod end pressure signal values that correspond to minimum pressures sufficient to hold the object being moved throughout the work cycle. As known by those skilled in the art, particular values stored in memory depend upon the object being moved by the work machine.

The user interface 110 could be any device such as a switch, push button, or the light capable of providing an input signal to the electronic controller 100. Preferably, the user interface 110 includes a set device 112 for providing a pressure set signal, a mode selection device 114 for providing a signal indicative of whether the work machine operator has selected manual, automatic, computer assisted or program mode, a release device 116 adapted to provide a pressure release signal, a gravical display (not shown) and a keyboard 118 adapted to receive operator input.

A bucket 120 for a work machine having a hydraulic cylinder 126 associated with it for controlling the movement of the bucket 120. At the head end of the hydraulic cylinder 126, a bucket head end pressure sensor 136 is adapted to sense the pressure at the head end of the hydraulic cylinder 126 and provide a signal indicative of the pressure to the controller 100. Similarly, a bucket rod end pressure sensor 130 is adapted to sense the pressure at the rod end of hydraulic cylinder 126 and provide a bucket rod end pressure signal indicative of the bucket rod end pressure to the controller 100.

Similarly, thumb 140 has a hydraulic cylinder 146 associated therewith for moving the thumb 140. A thumb head end pressure sensor 156 is adapted to sense the pressure in the head end of cylinder 146 and provide a thumb head end pressure signal indicative of the pressure in the head end of the thumb 140 to the controller 100. A rod end pressure sensor 150 is adapted to sense the pressure in the rod end of cylinder 146 and provide a thumb rod end pressure signal indicative of the pressure in the rod end of cylinder 146 to the controller 100.

Electrohydraulic valves 160, 170 are adapted to receive command signals from the controller 100 and control the pressure of the thumb and bucket acting on the object held therebetween.

In a preferred embodiment, the controller 100 is a 68HC11 microcontroller manufactured by Motorola located in Schaumburg, Ill. However, other suitable microcontrollers are known in the art, any one at which could be readily and easily used in connection with an embodiment of the present invention. A specific program code can be readily and easily written from the flow chart, shown in FIG. 2, in a specific assembling language or microcode for the selected microcontroller.

Now referring to FIG. 2, in a first block 200, program control of a preferred embodiment of the present invention begins. Program control passes to a second block 203.

In second block 203, the operator selection of manual, automatic, computer assisted or program mode is read. From second block 203, program control passes to third block 206 if manual mode was selected, control passes to fourth block 209 if automatic mode was selected, program control passes to tenth block 230 if computer assisted mode was selected and program control passes to 14th block 245 if program mode was selected.

In third block 206, program control returns to the main program.

Referring back to fourth block 209, a selected table value is read from the user interface 110. From fourth block 209, program control passes to fifth block 212. In fifth block 212, the predetermined bucket and thumb head and rod pressure values based on the table value are read from memory 105. From fifth block 212, program control passes to sixth block 215.

In sixth block 215, the program waits for the pressure set signal to be received. From sixth block 215, program control passes to seventh block 218.

In seventh block 218, the bucket and thumb head and rod in pressure signals are read from the bucket and thumb head and rod pressure sensors 130, 136, 150, 156. From seventh block 218, program control passes to first decision block 221.

In first decision block 221, the program determines whether the pressure release signal has been received. If the pressure release signal has been received, then program control passes to ninth block 227. Otherwise, program control passes to eighth block 224.

In ninth block 227, program control returns to the main program.

Referring back to eighth block 224, the program generates valve control signals to raise and maintain the bucket and thumb head and rod end pressure signal values substantially the same as the predetermined bucket and thumb head and rod pressure values. Preferably, the program uses Proportional +Integral+Dirivative (PID) control to raise and maintain the bucket and thumb head and rod end pressure signal values. Advantageously, the valve control signals are provided to electrohydraulic valves 160, 170. From eighth block 224, program control passes back to seventh block 218.

Referring back to tenth block 230, the program waits for the pressure set signal to be received. From tenth block 230, program control passes to 11th block 233.

In 11th block 233, the current bucket and thumb head and rod pressure signal values are read from the bucket and thumb head and rod end pressure sensors 130, 136, 150 and 156. From 11th block 233, program control passes to second decision block 236.

In second decision block 236, the program determines whether the pressure release signal has been received. If the pressure release signal has been received, then program control passes to 12th block 239. Otherwise, program control passes to 13th block 242.

In 12th block 239, program control returns to the main program.

In 13th block 242, the hydraulic pump (not shown) is destroked and valve control signals are generated to substantially maintain the bucket and thumb head and rod end pressure signal values. From 13th block 242, program control passes back to 11th block 233.

Referring back to 14th block 245, the description from the operator interface 110 is read and stored in memory 105. From 14th block 245, program control passes to 15th block 248.

In 15th block 248, the program waits for the pressure set signal to be received. From 15th block 248, program control passes to 16th block 251.

In 16th block 251, the current bucket and thumb head and rod in pressure signal values are read. From 16th block 251, program control passes to 17th block 254.

In 17th block 254, the predetermined minimum bucket and thumb head and rod end pressure signal values that correspond to the description are read from memory 105. From 17th block 254, program control passes to 3rd decision block 257.

In 3rd decision block 257, the program determines whether the bucket and thumb head and rod end pressure signal values are greater than the corresponding predetermined minimum bucket and thumb head and rod end pressure signal values. If the bucket and thumb head and rod end pressure signal values are greater than the corresponding predetermined minimum bucket and thumb head and rod pressure signal values program control passes to 18th block 260. Otherwise, program control passes to 20th block 269.

In 18th block 260, a warning message is generated and provide to the operator interface 110. From 18th block 260, program control passes to 4th decision block 263.

In 4th decision block 263, the program determines whether a valid override signal has been received. If a valid override signal has been received, then program control passes to 20th block 269. Otherwise, program control passes to 19th block 266.

In 20th block 269, the current bucket and thumb head and rod end pressure signal values are stored in memory 105. From 20th block 269, program control passes to 21st block 272.

In 21st block 272 and in 19th block 266, program control returns to the main program. The logic of FIG. 2 is preferably performed every control loop to help ensure that desired pressure is applied to the object being moved. However, those skilled in the art know that aspects of the pressure control could be determined at other frequencies and would fall within the scope of the present invention as defined by the appended clause.

While aspects of the present invention have been particularly shown and described with reference to the preferred embodiment above, it will be understood by those skilled in the art that various additional embodiments may be contemplated without departing from the spirit and scope of the present invention. For example, instead of using electrohydraulic valves 160, 170 on thumb 140, electrohydraulic valves 160, 170 could be used in conjunction with bucket 120 with or without using electrohydraulic valves 160, 170 on thumb 140. However, a device or method incorporating such additional embodiments should be understood to fall within the scope of the present invention as determined based upon the claims below and any equivalence thereof.

INDUSTRIAL APPLICABILITY

Work machines like a hydraulic excavator or backhoe loader are often equipped with a bucket and thumb to handle pipe, stumps, tree stems, and the like. However, if the operator does not control the bucket and thumb of the work machine properly, damage can often occur to pipe, stumps, tree stems and other similar objects moved by the work machine.

Therefore, it is desirable to have an implement control system for controlling clamping force on an object being held between a bucket and a thumb on a work machine that can at a touch of a switch turn the traditional excavator thumb into one that can be controlled as the thumb and forefinger combination of the human hand, thereby giving a "wristlike" action to the bucket thumb combination. To this end, the present invention provides for storing pressure values that have been determined to be adequate to grip the object being moved without causing damage to the object and allowing movement of the object to another location. The present invention achieves the foregoing by substantially maintaining set pressures on the gripped object throughout the work cycle of the work machine.

It should be understood that the invention is not limited to the exact details of construction, operation, materials or embodiments shown and described as obvious modifications and equivalent will be apparent to one skilled in the art. Therefore, other aspects, objects and advantages of the present invention can be obtained from a study of the drawings, the disclosure and the appending claims. Accordingly, the invention is, therefore, to be limited by the scope of the appending claims.

What is claimed is:

1. A work machine adapted to be controlled by an operator, comprising:
    a frame;
    a plurality of ground engaging devices supporting the frame;
    an operator compartment supported by the ground engaging devices;
    an engine operably coupled to the ground engaging devices;
    a work implement attached to the frame and including a bucket and a thumb; and
    a work machine control system for controlling the clamping force on an object being held between the bucket and thumb, including:
    an electronic controller;
    at least one pressure sensor electrically coupled to the electronic controller and adapted to produce a pressure signal indicative of the pressure applied by the bucket and thumb on an object being held therebetween;
    an operator control device for producing an operator control signal;
    a reciprocating device adapted to move the thumb relative to the bucket; and
    wherein the electronic controller receives the at least one pressure signal, the operator control signal and responsively delivers command signals to the reciprocating device in order to control the pressure applied by the bucket and thumb on an object being held therebetween.

2. The work machine of claim 1, wherein the reciprocating device includes at least one thumb hydraulic cylinder having head and rod ends and adapted to move the thumb.

3. The work machine of claim 1, wherein the reciprocating device includes at least one bucket hydraulic cylinder having head and rod ends and adapted to move the bucket, and wherein the at least one pressure sensor includes a bucket head end pressure sensor electrically coupled to the electronic controller and adapted to produce a bucket head end pressure signal indicative of the pressure at the head end of the bucket cylinder, a bucket rod end pressure sensor electrically coupled to the electronic controller and adapted to produce a bucket rod end pressure signal indicative of the pressure at the rod end of the bucket cylinder, a thumb head end pressure sensor electrically coupled to the electronic controller and adapted to produce a thumb head end pressure signal indicative of the pressure at the head end of the thumb cylinder and a thumb rod end pressure sensor electrically coupled to the electronic controller and adapted to produce a thumb rod end pressure signal indicative of the pressure at the rod end of the thumb cylinder.

4. The work machine of claim 3, wherein the operator control device is adapted to produce a pressure set signal and a pressure release signal.

5. The work machine of claim 4, wherein the controller delivers command signals to the bucket and thumb hydraulic cylinders in order to maintain the pressure applied by the bucket and thumb on an object being held therebetween in response to the pressure set signal and to substantially no pressure in response to the pressure release signal.

6. The work machine of claim 4, including a memory in communication with the controller and adapted to store a plurality of bucket and thumb head and rod end pressure signal values.

7. The work machine of claim 6, wherein the electronic controller receives bucket and thumb head and rod end pressure signal values, the bucket and thumb head and rod end pressure signals, the pressure set signal, and the pressure release signal and delivers command signals to the bucket and thumb hydraulic cylinders in order to control the pressure applied by the bucket and thumb on an object being held therebetween to the bucket and thumb head and rod end pressure signal values in response to the pressure set signal and to substantially no pressure in response to the pressure release signal.

8. The work machine of claim 6, wherein the electronic controller reads the bucket and thumb head and rod end pressure signals and stores corresponding bucket and thumb head and rod end pressure values in memory in response to the pressure set signal.

9. A method of controlling the clamping force on an object being held between a bucket and a thumb of a work machine, comprising the steps of:
    producing at least one pressure signal indicative of the pressure applied by the bucket and thumb on an object being held therebetween;
    producing an operator control signal; and
    receiving the at least one pressure signal and the operator control signal and responsively delivering command signals to a reciprocating device in order to control the pressure applied by the bucket and thumb on an object being held therebetween.

10. The method of claim 9, including producing a bucket head end pressure signal indicative of the pressure at the head end of a bucket cylinder, a bucket rod end pressure signal indicative of the pressure at the rod end of the bucket cylinder, a thumb head end pressure signal indicative of the pressure at the head end of a thumb cylinder and a thumb rod end pressure signal indicative of the pressure at the rod end of the thumb cylinder.

11. The method of claim 9, wherein the step of producing an operator control signal includes producing a pressure set signal and a pressure release signal.

12. The method of claim 11, wherein the command signals are delivered in order to maintain the pressure applied by the bucket and thumb on an object being held therebetween in response to the pressure set signal and to substantially release pressure in response to the pressure release signal.

13. The method of claim 11, including the step of storing a plurality of bucket and thumb head and rod end pressure signal values.

14. The method of claim 13, including the steps of receiving bucket and thumb head and rod end pressure signal values, the bucket and thumb head and rod end pressure signals, the pressure set signal, and the pressure release signal and delivering command signals to the bucket and thumb hydraulic cylinders in order to control the pressure applied by the bucket and thumb on an object being held therebetween to the bucket and thumb head and rod end pressure signal values in response to the pressure set signal and to substantially release pressure in response to the pressure release signal.

15. The method of claim 13, including the steps of reading the bucket and thumb head and rod end pressure signals and storing corresponding bucket and thumb head and rod end pressure values in memory in response to the pressure set signal.

16. An apparatus for controlling the clamping force on an object being held between a bucket and a thumb of a work machine, comprising:

an electronic controller;

at least one bucket hydraulic cylinder having head and rod ends and adapted to move the bucket;

at least one thumb hydraulic cylinder having head and rod ends and adapted to move the thumb;

at least one bucket head end pressure sensor electrically coupled to the electronic controller and adapted to produce a bucket head end pressure signal indicative of the pressure at the head end of the at least one bucket cylinder;

at least one bucket rod end pressure sensor electrically coupled to the electronic controller and adapted to produce a bucket rod end pressure signal indicative of the pressure at the rod end of the at least one bucket cylinder;

at least one thumb head end pressure sensor electrically coupled to the electronic controller and adapted to produce a thumb head end pressure signal indicative of the pressure at the head end of the at least one thumb cylinder;

at least one thumb rod end pressure sensor electrically coupled to the electronic controller and adapted to produce a thumb rod end pressure signal indicative of the pressure at the rod end of the at least one thumb cylinder;

an operator interface for producing a pressure set signal, a pressure release signal and a mode signal having automatic, computer assisted and program modes;

a memory in communication with the controller and adapted to store a plurality of bucket and thumb head and rod end pressure signal values; and wherein the electronic controller receives bucket and thumb head and rod end pressure signal values, the bucket and thumb head and rod end pressure signals, the pressure set signal, the pressure release signal, the mode signal and in response to the mode signal being automatic mode the controller delivers command signals to the bucket and thumb hydraulic cylinders in order to control the pressure applied by the bucket and thumb on an object being held therebetween to the bucket and thumb head and rod end pressure signal values in response to the pressure set signal and to substantially no pressure in response to the pressure release signal, in response to the mode signal being computer assisted mode the controller delivers command signals to the bucket and thumb hydraulic cylinders in order to maintain the pressure applied by the bucket and thumb on an object being held therebetween in response to the pressure set signal and to substantially no pressure in response to the pressure release signal and in response to the mode signal being program mode and the pressure set signal the controller reads the bucket and thumb head and rod end pressure signals and stores corresponding bucket and thumb head and rod end pressure values in memory.

* * * * *